United States Patent
Lin (10) Patent No.: US 7,543,862 B2
(45) Date of Patent: Jun. 9, 2009

(54) MAGNET LATCH

(75) Inventor: Jung-Hong Lin, Taipei (TW)

(73) Assignee: Inventec Corporation, Taipei (TW)

( * ) Notice: Subject to any disclaimer, the term of this patent is extended or adjusted under 35 U.S.C. 154(b) by 435 days.

(21) Appl. No.: 11/601,664

(22) Filed: Nov. 20, 2006

(65) Prior Publication Data

US 2008/0136197 A1 Jun. 12, 2008

(51) Int. Cl.
*E05C 17/56* (2006.01)
*E05C 19/16* (2006.01)

(52) U.S. Cl. ............. 292/251.5; 292/137; 292/140; 292/150; 292/163; 292/302; 292/DIG. 11; 292/DIG. 37; 312/223.2; 361/679.57; 361/679.58

(58) Field of Classification Search ............ 292/137, 292/140, 146, 150, 163, 251.5, 302, DIG. 11, 292/DIG. 37, 169; 312/223.2–223.6; 361/679.57, 361/679.58
See application file for complete search history.

(56) References Cited

U.S. PATENT DOCUMENTS

| 711,812 | A | * | 10/1902 | Armstrong | 24/657 |
|---|---|---|---|---|---|
| 3,736,779 | A | * | 6/1973 | Pratt | 70/276 |
| 4,630,852 | A | * | 12/1986 | White et al. | 292/87 |
| 4,687,236 | A | * | 8/1987 | Rasche | 292/16 |
| 6,343,824 | B1 | * | 2/2002 | Foy | 294/82.35 |
| 7,088,588 | B2 | * | 8/2006 | Lee | 361/725 |
| 7,216,900 | B2 | * | 5/2007 | Liu et al. | 292/98 |
| 7,261,331 | B2 | * | 8/2007 | Lin | 292/116 |
| 7,405,927 | B2 | * | 7/2008 | Lev | 361/679.55 |
| 7,407,202 | B2 | * | 8/2008 | Ye et al. | 292/251.5 |
| 7,410,194 | B2 | * | 8/2008 | Chen et al. | 292/37 |
| 2008/0218953 | A1 | * | 9/2008 | Yun et al. | 361/681 |
| 2009/0051174 | A1 | * | 2/2009 | Ho | 292/251.5 |

FOREIGN PATENT DOCUMENTS

| GB | 2145461 A | * | 3/1985 |
|---|---|---|---|
| GB | 2264975 A | * | 9/1993 |

* cited by examiner

*Primary Examiner*—Carlos Lugo
(74) *Attorney, Agent, or Firm*—Morris, Manning & Martin LLP; Tim Tingkang Xia (57) ABSTRACT

A magnet latch applying magnetic force for opening and closing the upper and lower cases is provided. The magnet latch includes a push button, a sliding block, a magnet, a magnetic hook, and an elastic member. To close the upper and lower cases, one moves the push button to slide the sliding block to one side. The magnetic hook is attracted by the magnet to move upwards. Once the magnetic hook attaches to the magnet, the push button is released and the sliding block moves toward and holds the magnetic hook, so as to achieve the purpose of magnetic latching. On the other hand, to open the upper case, one moves the push button to slide the sliding block to the other side, thereby opening up the upper case. Due to the weakened magnetic force and its own gravity, the magnetic hook returns back into the lower case.

4 Claims, 9 Drawing Sheets

FIG.8 ent devices,
MAGNET LATCH

BACKGROUND OF THE INVENTION

1. Field of Invention

The invention relates to a latch for latching an upper case and a lower case, and in particularly, to a magnet latch applying magnetic force for opening and closing the upper case and the lower case.

2. Related Art

Along with the unceasingly renewing electronic devices, people request the function and quality of the products more and more. Particularly the manufacturers of notebook computers within the electronic information devices devote much research and developments in the products.

Notebook computers nowadays, besides being unceasingly upgraded of their operating speed, are also aimed at the weight and volume of the case to be light in weight and compact in size. On the latches of the upper and lower cases of notebook computers, they are also designed to be more convenient for consumers to use.

Currently, the latch of a notebook computer usually includes a pressing button located on outer side of the liquid crystal display. When a user depresses the button inward, a hook extruding from the case of the liquid crystal display (LCD) is released from a slot formed on the main case of the notebook computer so that the case of the LCD is released. As the hook is exposed from the case, it may be damaged, inelastic, or non-contractible due to frequent and long-time use, which leads to inconvenience in use.

In addition, because nowadays people treasure esthetic design of products, the appearance of notebook computer becomes a favorite consideration factor of consumers. It is not only to be stylish, but also to be simple and agile in the outlook of the case. Therefore, how to reduce extruding portions, like the extruding hook, on the case of notebook computer is also a design issue for the manufacturers.

SUMMARY OF THE INVENTION

Accordingly, it is an object of the present invention to provide a magnet latch applied to a notebook computer for opening and closing an upper and lower cases of the notebook computer to avoid the damage, inelastic, or non-contractible problems due to frequent and long-time use in prior art.

Another object of the invention is to provide a magnet latch applied to a notebook computer for opening and closing an upper and lower cases of the notebook computer to get rid of extruding portion in design.

With the forgoing object in view, according to one aspect of the invention, a magnet latch includes a push button, a sliding block, a magnet, a magnetic hook, and an elastic member. The magnet and the sliding block are disposed in the upper case, while the magnetic hook is disposed in the lower case. Under appropriate conditions, the magnetic hook is attracted by the magnet and moves upwards. The magnetic hook has a hook portion and a tail portion, with a stopper provided in the vicinity of the tail portion. When the push button outside the upper case is pushed, the sliding block is driven to move between a first position and a second position. If the sliding block is at the first position, it blocks the path for the magnetic hook to move upwards. On the other hand, if the sliding block is at the second position and the upper case is closed, the hook portion of the magnetic hook is attracted by the magnet and moves upwards. Moreover, one side of the sliding block has an elastic member with constantly pushing force, which may push the sliding block from the second position to the first position. When the magnetic hook is attached to the magnet, the sliding block thus holds the magnetic hook. Therefore, the hook portion is connected to the sliding block, preventing the upper case from being opened. To open the upper case, the sliding block is moved to the second position, opening up the upper case. Due to the weakened magnetic force and its own gravity, the magnetic hook returns back into the lower case. This achieves the purposes of opening and closing the two cases.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
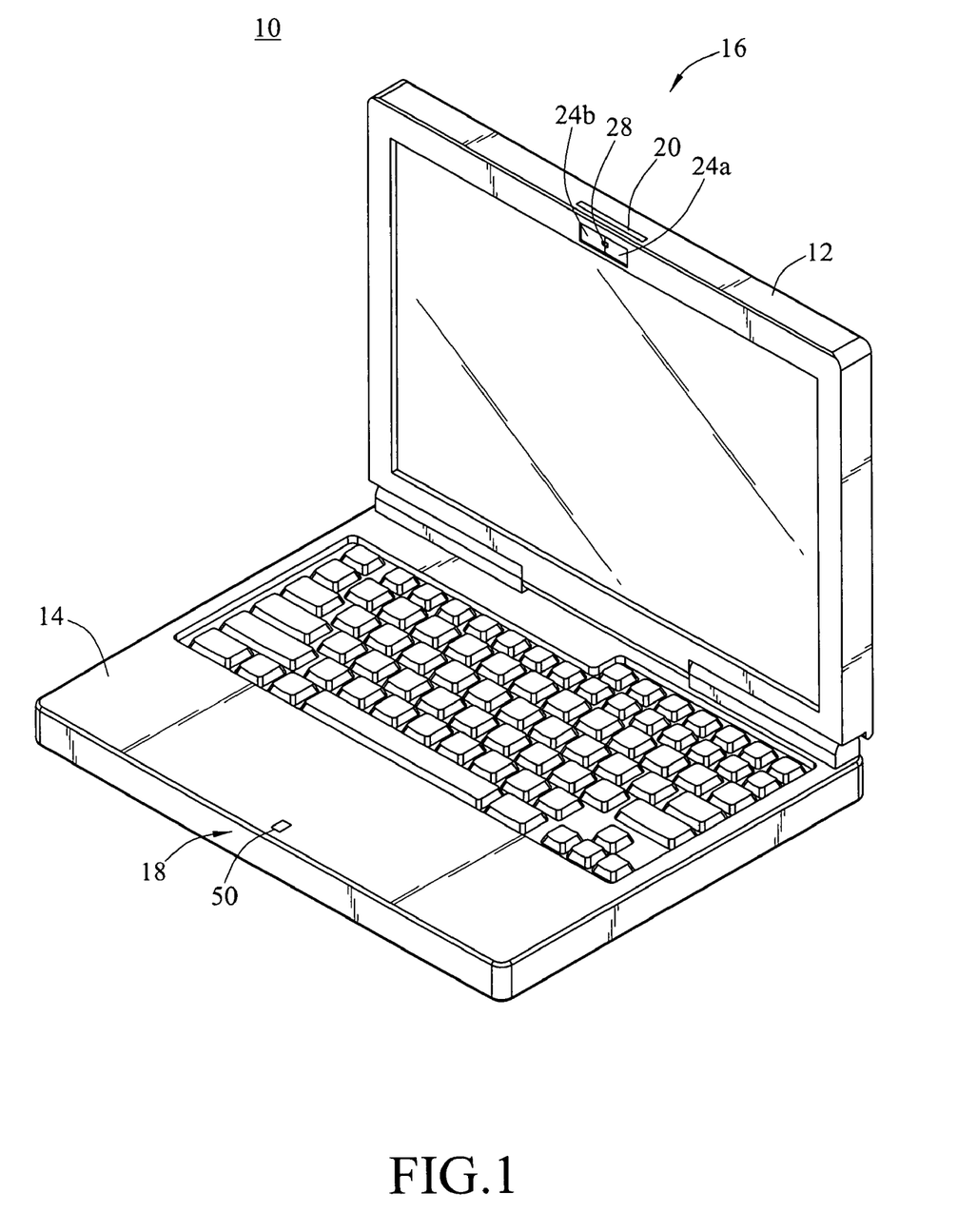
FIG. 1 shows the position of the invention in a notebook computer.
Figure 2:
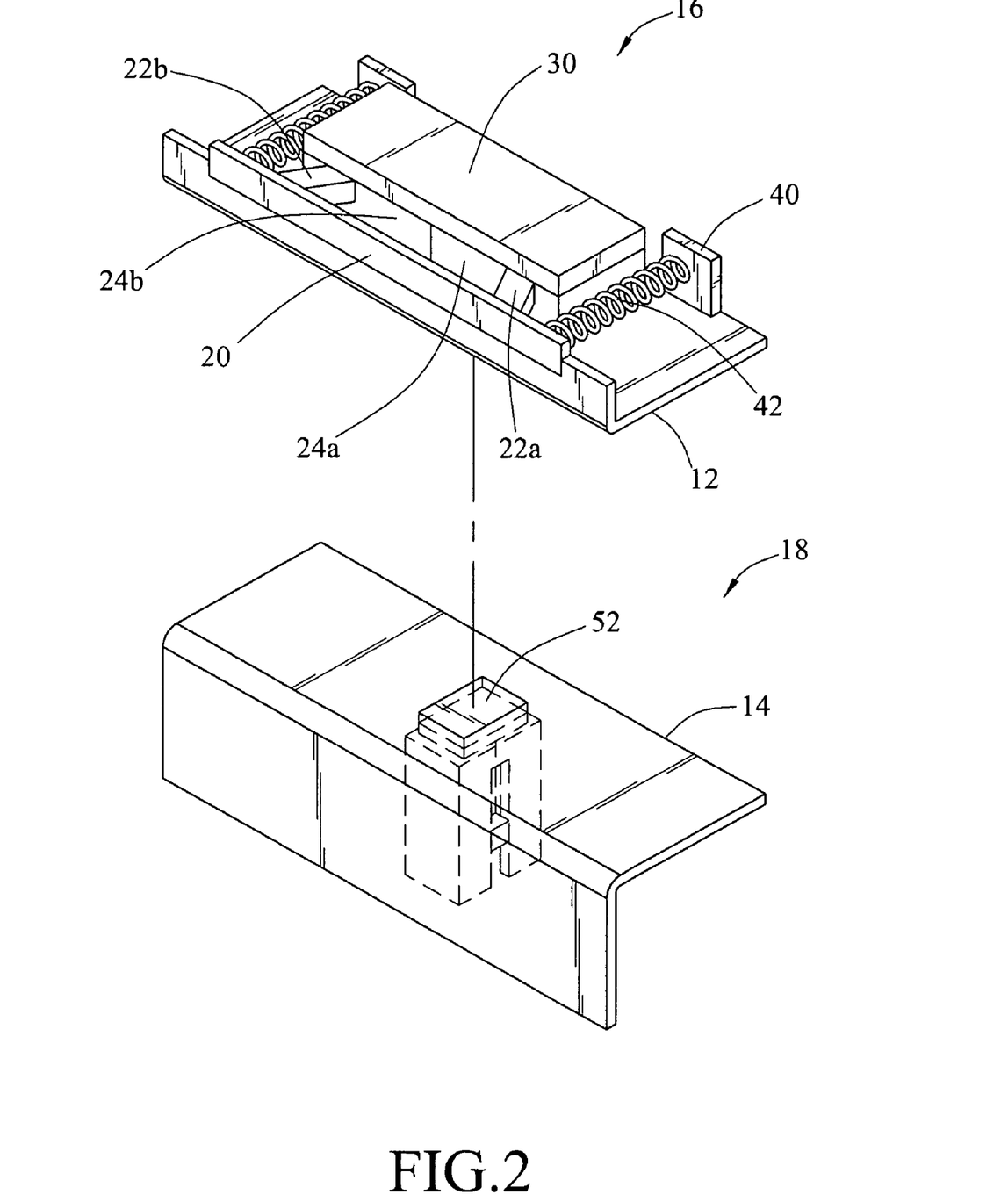
FIG. 2 shows a first embodiment of the invention.

As shown in FIGS. 1 and 2, they show the position of the invention in a notebook computer and a first embodiment of the invention. The magnet latch is used inside upper and lower cases 12, 14 of a notebook computer 10 for opening and closing the upper and lower cases. An upper portion 16 is disposed inside the upper case 12, and a lower portion 18 is disposed inside the lower case 14. The upper portion 16 includes a magnet 30 and two sliding blocks 24a, 24b. When the two sliding blocks 24a, 24b are close to each other, a cavity 28 is formed in between. In addition, a push button 20 is installed outside the upper case 12 for driving the two sliding blocks 24a, 24b. Besides, a hole 50 is formed on the lower case 14. Therefore, the magnetic hook 52 in the lower portion 18 inside the lower case 14 can move up and out of the hole 50.

Figure 3A:
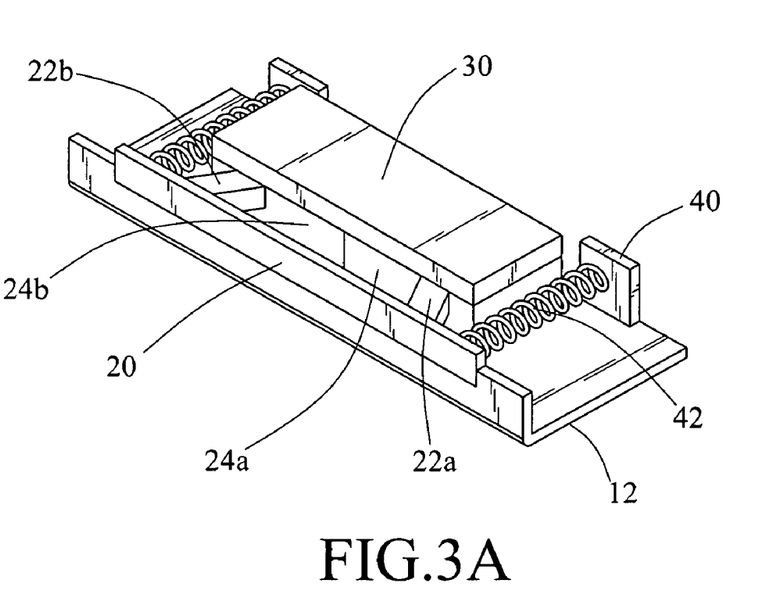
FIG. 3A is a top view of the upper portion of the invention.
Figure 3B:
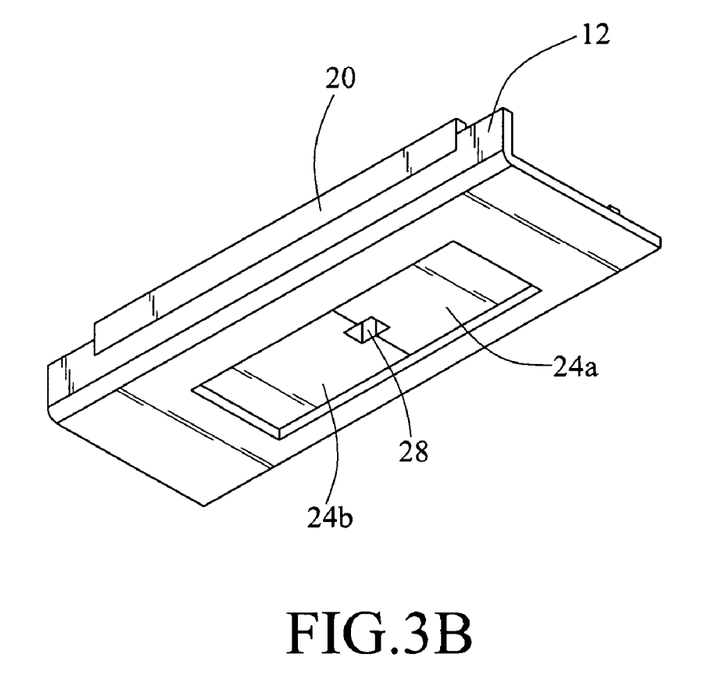
FIG. 3B is a bottom view of the upper portion of the invention.
Figure 3C:
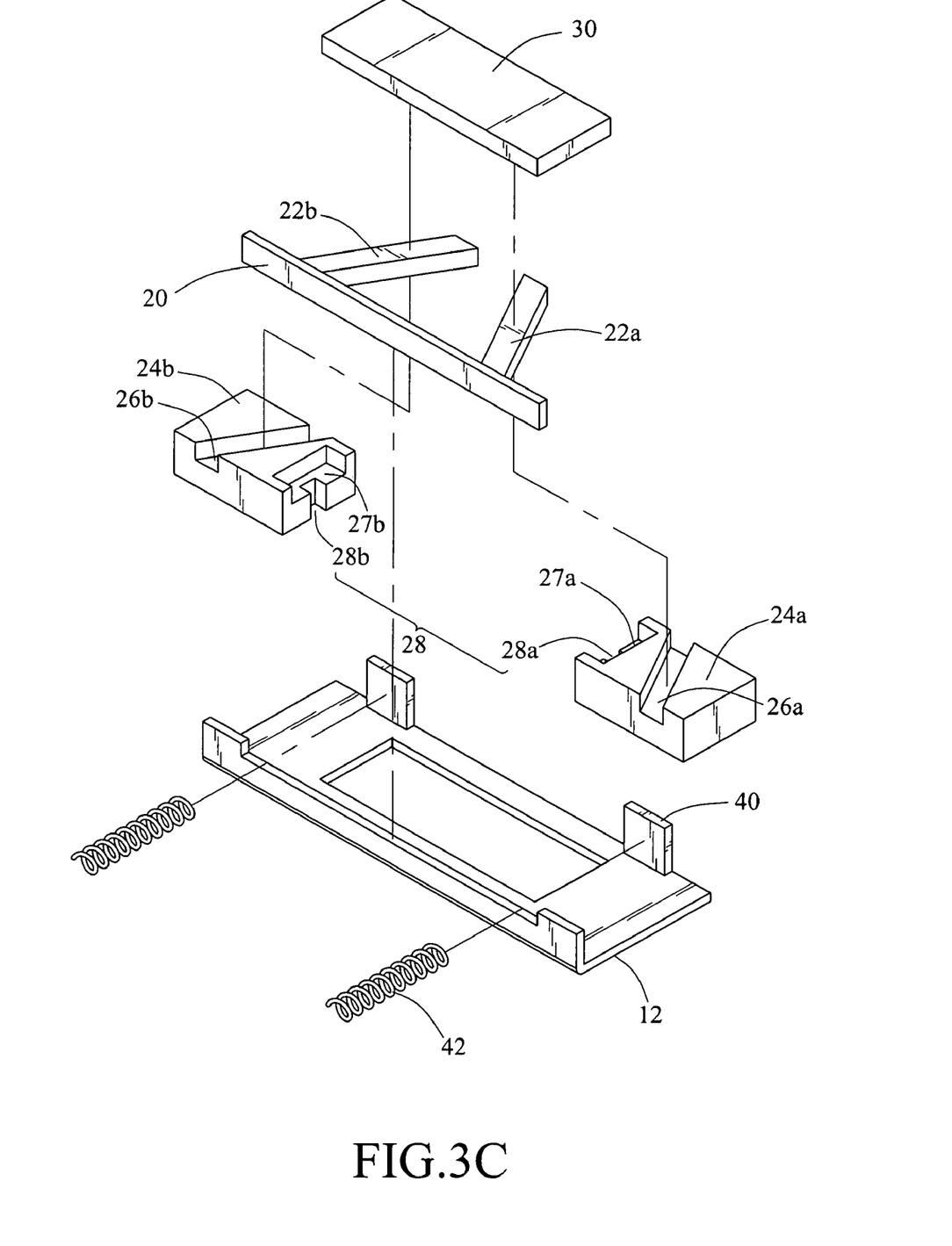
FIG. 3C is an exploded view of the upper portion of the invention.

The structure of the upper portion 16 of the invention is shown in FIGS. 3A, 3B, and 3C. They are a top view, a bottom view, and an exploded view of the upper portion 16 of the invention respectively. Two sliding blocks 24a, 24b are disposed in the upper case 12. The sliding blocks 24a, 24b are respectively formed with guiding grooves 26a, 26b. Afterwards, a push button 20 with two guiding rods 22a, 22b is disposed on the sliding blocks 24a, 24b. The two guiding rods 22a, 22b on the push button 20 are embedded in the guiding grooves 26a, 26b on the two sliding blocks 24a, 24b. Finally, a magnet 30 is disposed above the two guiding rods 22a, 22b. Moreover, two stop portions 40 are provided and fixed in the upper case 12. Then, an elastic member 42, such as a spring, is disposed between the push button 20 and the stop portion 40. Since the elastic member 42 constantly has a pushing force. Therefore, the pushed button 20 can be restored to its original position.

Figure 4A:
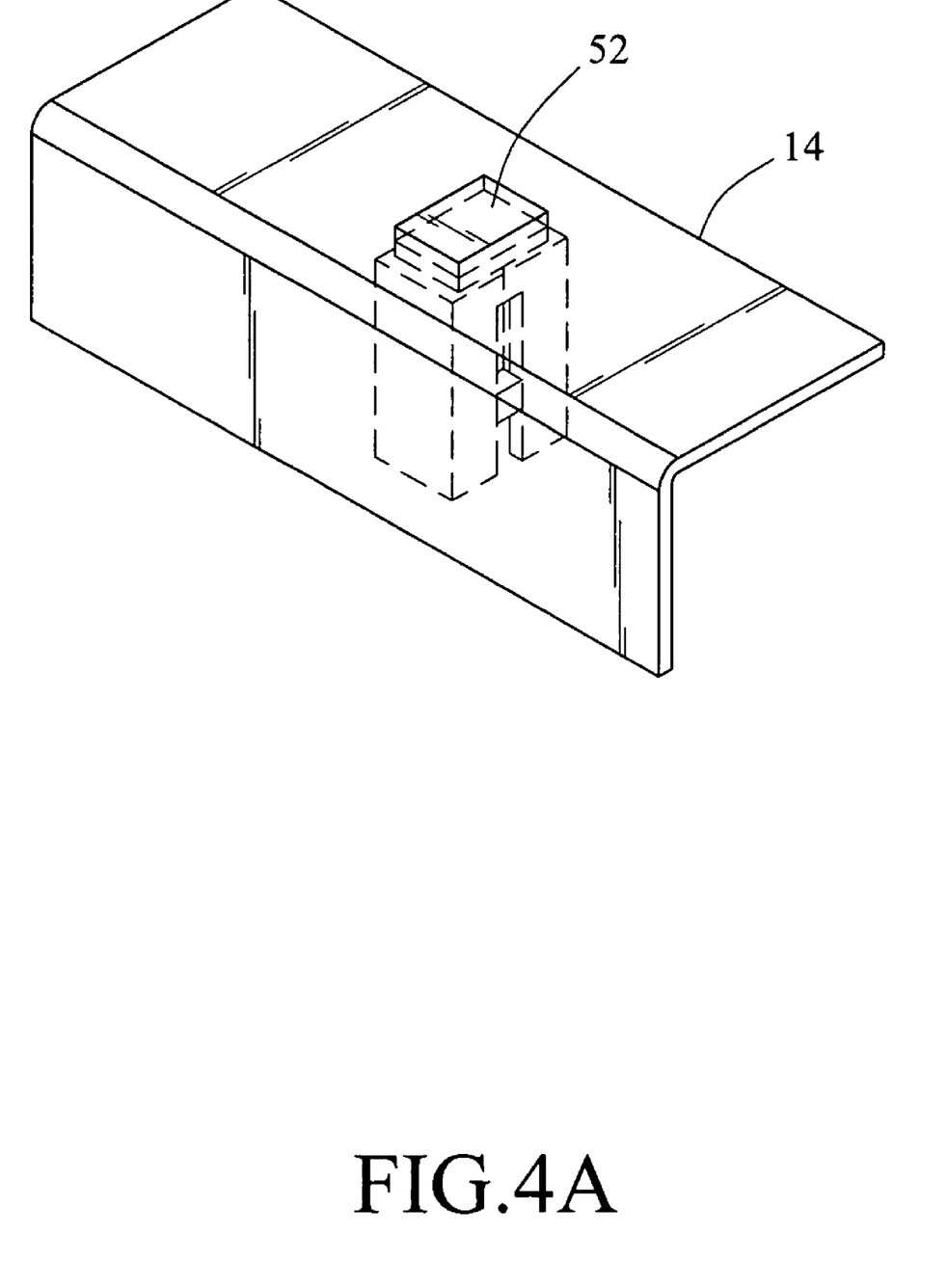
FIG. 4A is a top view of the lower portion of the invention.
Figure 4B:
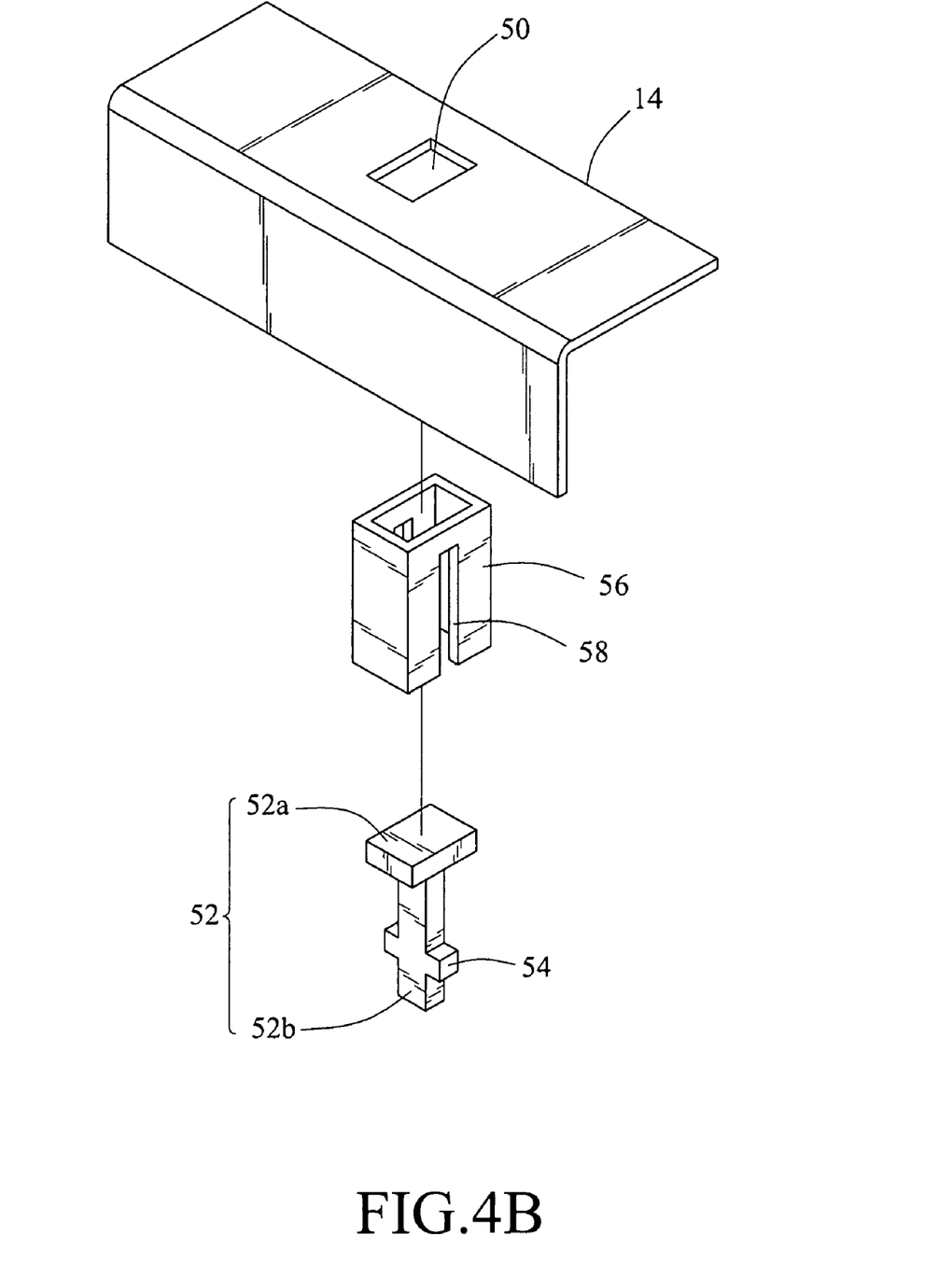
FIG. 4B is an exploded view of the lower portion of the invention.

As shown in FIGS. 2, 4A, and 4B, they are a first embodiment of the invention, a top view of the structure of the lower portion, and an exploded view of the structure of the lower portion, respectively. A magnetic hook 52 is disposed on the lower case 14 at a position facing to the upper case 12 and the magnetic hook 52 has a hook portion 52a and a tail portion 52b. Besides, a stopper 54 is provided above the tail portion 52b. A cylinder 56 is disposed in the lower case 14 for accommodating the magnetic hook 52 and for restricting the magnetic hook 52 to slide therein. Guiding grooves 58 are formed on the sides of the cylinder 56. Since the stopper 54 is provided in the vicinity of the tail portion 52b of the magnetic hook 52, the tail portion 52b of the magnetic hook 52 is restricted to remain in the lower case 14 as it slides in the guiding grooves 58 of the cylinder 56. Therefore, when the magnetic hook 52 is attracted by the magnet 30, it does not depart from the lower case 14. Besides, forming sliding tracks (not shown) in the upper case 12 makes the two sliding blocks 24a, 24b easier to move.

Figure 5A:
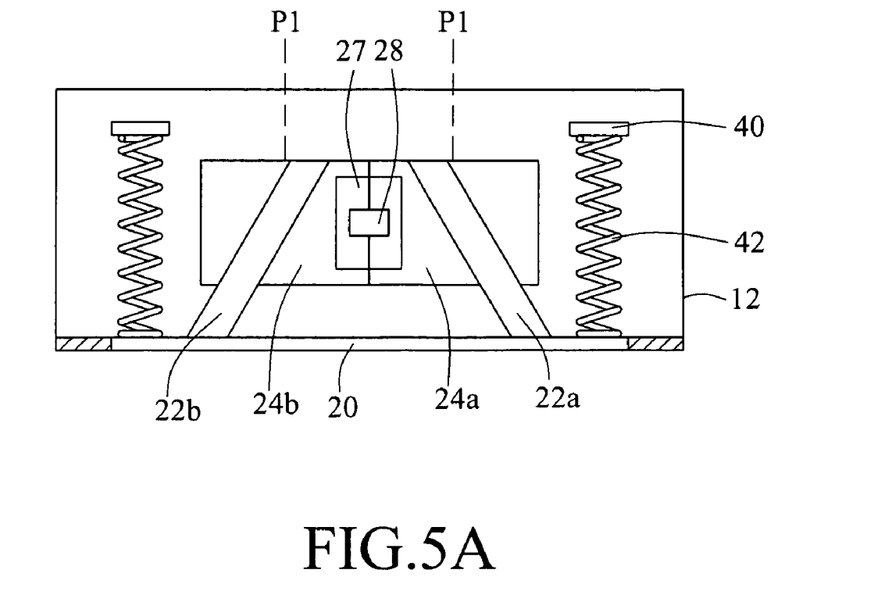
FIG. 5A shows the upper portion of the invention before an action.
Figure 5B:
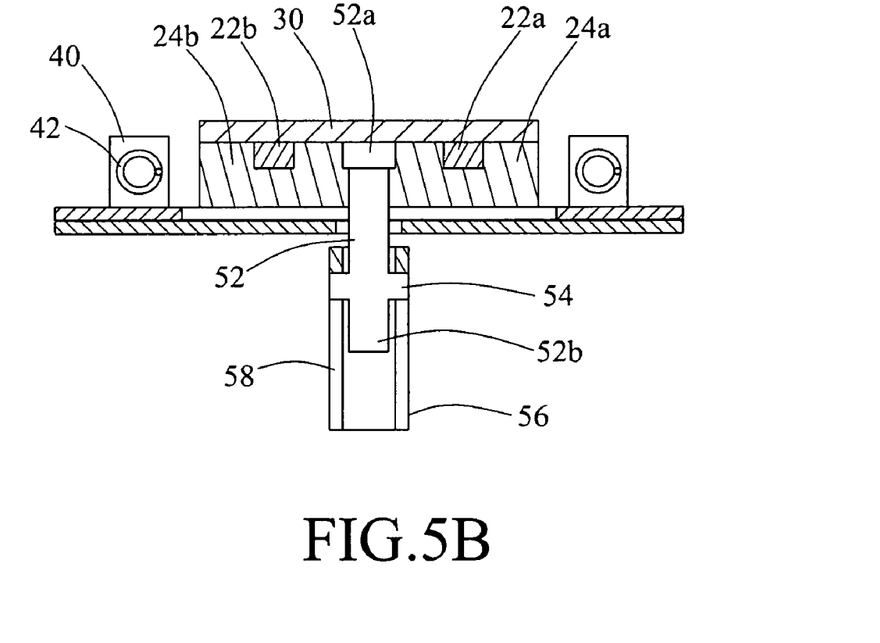
FIG. 5B is a cross-sectional view showing the upper portion of the invention before an action.

As shown in FIGS. 5A and 5B, they show a cross-sectional view showing the upper portion before an action and the structure of the upper portion after the action, respectively. In order to close or open the upper case 12 of the notebook computer 10, one needs to press the push button 20. Since the two guiding rods 22a, 22b of the push button 20 are respectively embedded in the guiding grooves 26a, 26b of the two sliding blocks 24a, 24b, the two sliding blocks 24a, 24b originally at the first position P1 move outward respectively. In this case, the cavity 28 formed from the openings 28a, 28b on the sides of the two sliding blocks 24a, 24b becomes bigger. When the two sliding blocks 24a, 24b move to the second position P2, the cavity 28 is big enough to be a through hole 29 so that the hook portion 52a of the magnetic hook 52 inside the lower case 14 can go through. The magnetic hook 52 thus attaches itself to the magnet 30.

Figure 6A:
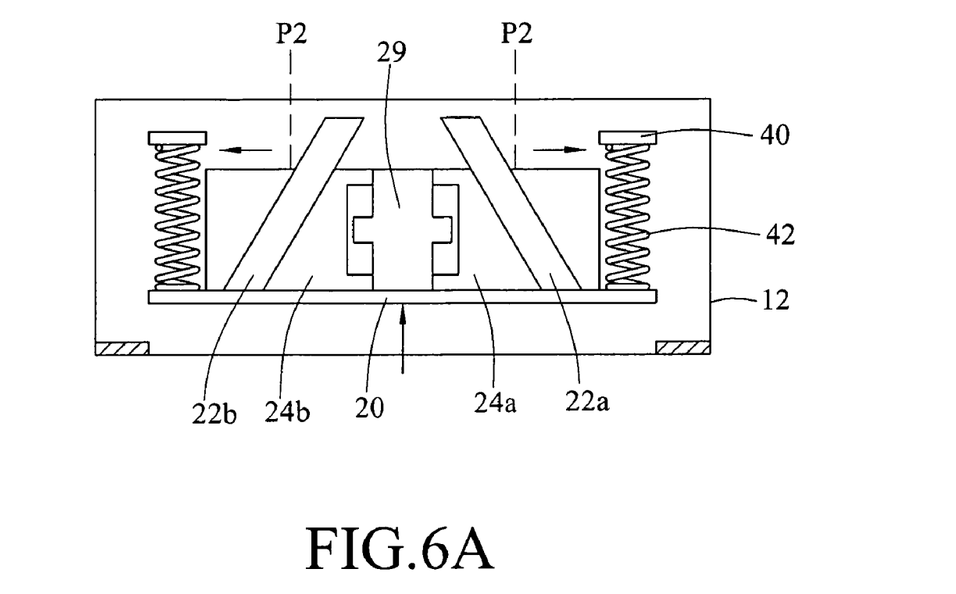
FIG. 6A shows the upper portion of the invention after the action.
Figure 6B:
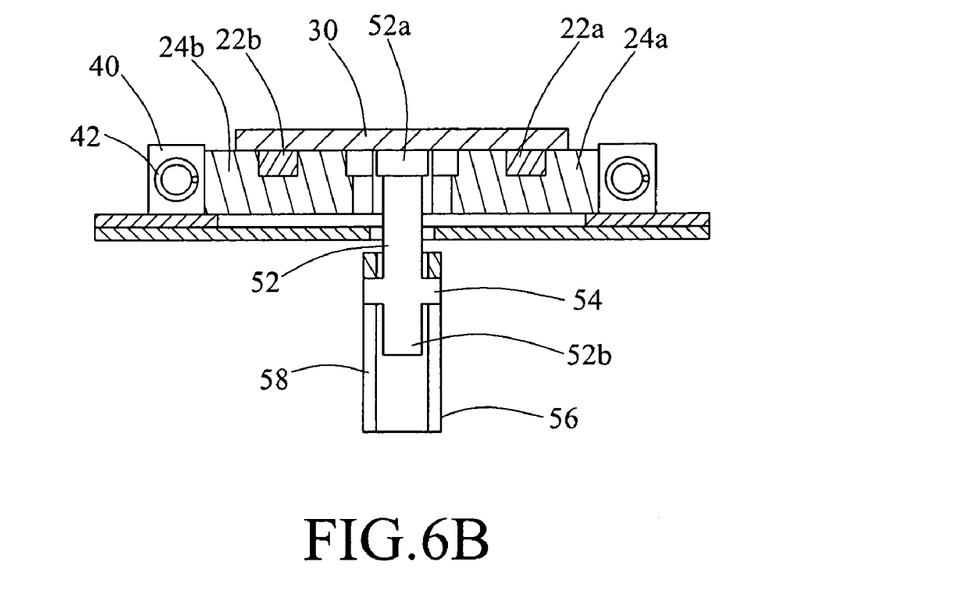
FIG. 6B is a cross-sectional view showing the upper portion of the invention after the action.

As shown in FIGS. 6A and 6B, the show the upper portion and a cross-sectional view of the upper portion after the action. When the push button 20 is released, a pushing force constantly existing in the elastic member 42 pushes the push button 20 back to its original position. As the two guiding rods 22a, 22b of the push button 20 are embedded in the guiding grooves 26a, 26b of the two sliding blocks 24a, 24b, the two sliding blocks 24a, 24b originally at the second position P2 move toward the center. In this case, the through hole 29 shrinks to the original cavity 28. The hook portion 52a of the magnetic hook 52 attached to the magnet 30 is thus restricted in the groove 27 formed from the grooves 27a, 27b on the sides the two sliding blocks 24a, 24b. Therefore, the purpose of magnetic latching is achieved. On the other hand, to open the upper case 12, one presses the push button 20 to drive the two sliding blocks 24a, 24b to the second position P2 and open the upper case 12 simultaneously. At this time, due to the weakened magnetic force and its own gravity, the magnetic hook 52 returns back into the lower case 14.

Figure 7:
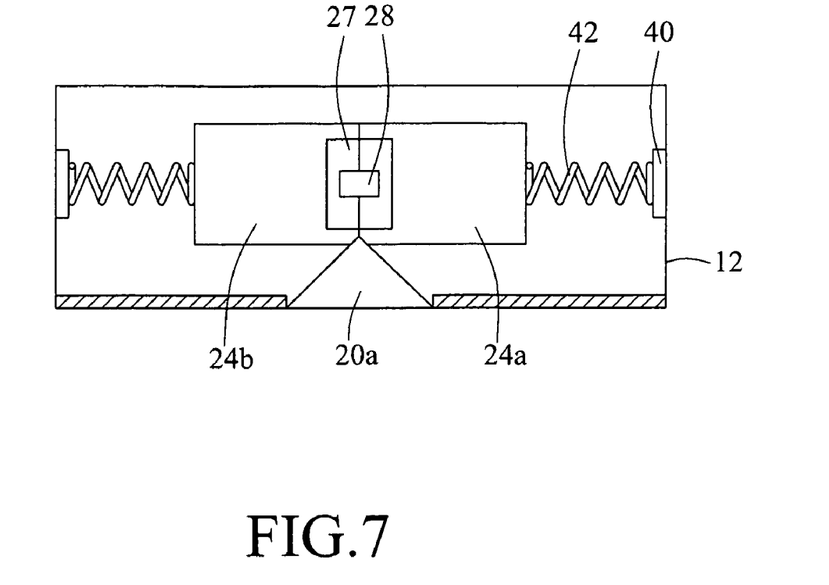
FIG. 7 shows a second embodiment of the invention.

FIG. 7 shows a second embodiment of the invention. Each of the stop portion 40 and the elastic member 42 are disposed on one side of the two sliding blocks 24a, 24b respectively. One part of the push button 20a is disposed between the two sliding blocks 24a, 24b. After the push button 20a is released, the compressed elastic member 42 with constant pushing force pushes the moved two sliding blocks 24a, 24b back to their original positions. This also achieves the purpose of latching.

Figure 8:
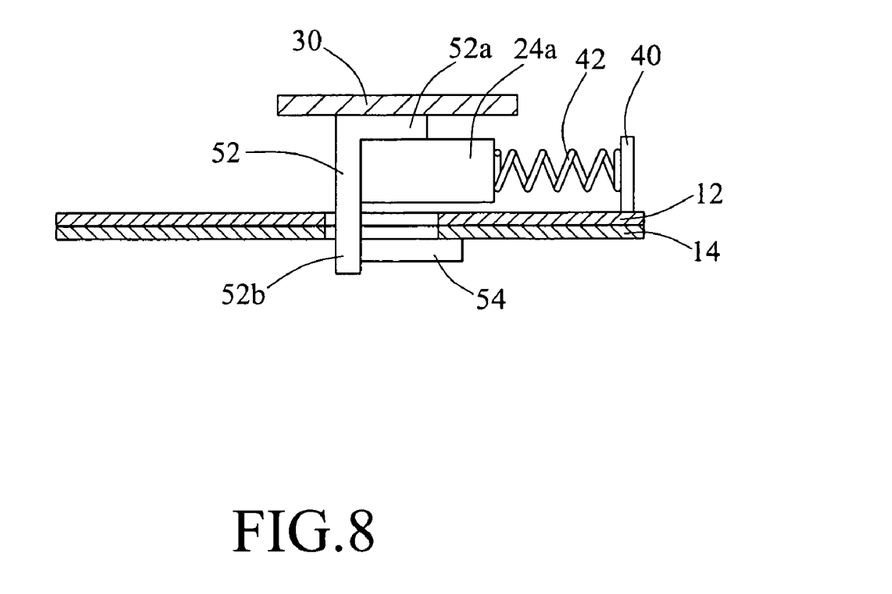
FIG. 8 shows a third embodiment of the invention.

For the upper portion of the upper case 12, one sliding block 24a can also achieve the purpose of latching. As shown in FIG. 8, it shows a third embodiment of the invention. To close the upper case 12, the sliding block 24a is moved to one side, so that it does not block the path for the magnetic hook 52 to move upward. Therefore, the magnetic hook 52 of the lower case 14 can thus attach itself to the magnet 30 of the upper case 12. After the sliding block 24a is released, the elastic member 42 with constant pushing force disposed on one side of the sliding block 24a pushes the sliding block 24a toward the magnetic hook 52 and to hold the magnetic hook 52. This also achieves the purpose of magnetic latching.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnet latch applied to a notebook computer for opening and closing an upper and lower cases of the notebook computer, comprising:

a magnet, disposed in the upper case;

a magnetic hook, disposed in the lower case and having a hook portion such that when the upper case is closed, the hook portion moves from the lower case to the upper case to attach to the magnet due to the attraction of the magnet; and a sliding block, disposed in the upper case, moving between first position and second positions;

a push button provided outside the upper case to push the sliding block between the first and second positions;

an elastic member provided on one side of the sliding block to provide a constant pushing force to push the sliding block from the second position to the first position;

wherein, in order to close the upper case, a pushing force is exerted on the push button to push the sliding block from the first position, wherein the sliding block blocks the moving path of the magnetic hook, toward the second position, allowing the magnetic hook to move and engage the magnet, when the magnetic hook is engaged to the magnet, the pushing force is eliminated so that the sliding block can move back to the first position by means of the elastic member so as to maintain the engagement of the magnetic hook and the magnet;

wherein, in order to open the upper case, a pushing force is exerted on the push button to push the sliding block from the first position toward the second position, disengaging the connection between the sliding block with the magnetic hook, so that the magnetic engagement between the magnetic hook and the magnet can be disengaged by lifting the upper case away from the lower case, the magnetic hook is returned back into the lower case due to its gravity, and the pushing force is eliminated so that the sliding block can move back to the first position.

2. The magnet latch of claim 1, wherein the magnetic hook has a tail portion and a stopper, wherein the stopper is used to restrict the tail portion of the magnetic hook inside the lower case.

3. The magnet latch of claim 1 further comprising a cylinder disposed inside the lower case for the magnetic hook to slide therein and for restricting the moving path of the magnetic hook.

4. The magnet latch of claim 1, wherein a sliding track is formed in the upper case for the sliding block to move therein.

* * * * *